(12) United States Patent
Stergiou et al.

(10) Patent No.: US 8,554,696 B2
(45) Date of Patent: Oct. 8, 2013

(54) EFFICIENT COMPUTATION OF ONTOLOGY AFFINITY MATRICES

(75) Inventors: Stergios Stergiou, Sunnyvale, CA (US); Yannis Labrou, Washington, DC (US); Jawahar Jain, Santa Clara, CA (US)

(73) Assignee: Fujitsu Limited, Kawasaki-shi (JP)

( * ) Notice: Subject to any disclaimer, the term of this patent is extended or adjusted under 35 U.S.C. 154(b) by 441 days.

(21) Appl. No.: 12/658,531

(22) Filed: Feb. 10, 2010

(65) Prior Publication Data
US 2010/0211534 A1 Aug. 19, 2010

Related U.S. Application Data

(60) Provisional application No. 61/152,375, filed on Feb. 13, 2009.

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| | | |
|---|---|---|
| 6,587,848 B1 | 7/2003 | Aggarwal et al. |
| 6,651,096 B1 | 11/2003 | Gai et al. |
| 6,847,966 B1 | 1/2005 | Sommer et al. |
| 6,996,572 B1 | 2/2006 | Chakrabarti et al. |
| 2002/0174119 A1 | 11/2002 | Kummamuru et al. |
| 2003/0167163 A1 | 9/2003 | Glover et al. |
| 2005/0251526 A1* | 11/2005 | Nayak ............................ 707/100 |
| 2007/0083506 A1* | 4/2007 | Liddell et al. ...................... 707/5 |
| 2008/0154938 A1* | 6/2008 | Cheslow ........................ 707/102 |
| 2008/0215563 A1* | 9/2008 | Shi et al. ............................ 707/5 |
| 2008/0281764 A1* | 11/2008 | Baxter ............................ 706/12 |
| 2008/0313140 A1* | 12/2008 | Pereira et al. ...................... 707/2 |
| 2009/0094262 A1 | 4/2009 | Marvit et al. |

FOREIGN PATENT DOCUMENTS

| | | |
|---|---|---|
| WO | WO 2005/091825 A2 | 6/2005 |
| WO | WO 2006/125271 A1 | 11/2006 |

OTHER PUBLICATIONS

'Inverted Index': <http://en.wikipedia.org/wiki/Inverted_index> retrieved from the internet Apr. 19, 2012.*
The State Intellectual Property Office of China, First Notification of Office Action, Patent Application No. 200810165999.X, Chinese Office Action and English translation, 13 pages, May 27, 2010.
Gonzalo Navarro, Modern Information Retrieval, Chapter 8: *Indexing and Searching*, ACM Press, New York, XP 002457291, ISBN 9780201398298, pp. 191-228, Jan. 1, 1999.

(Continued)

*Primary Examiner* — Kakali Chaki
*Assistant Examiner* — Peter Coughlan
(74) *Attorney, Agent, or Firm* — Baker Botts L.L.P.

(57) ABSTRACT

In one embodiment, generating an ontology includes accessing an inverted index comprising a plurality of inverted index lists. An inverted index list may correspond to a term of a language. Each inverted index list may comprise a term identifier of the term and one or more document identifiers indicating one or more documents of a document set in which the term appears. The embodiment also includes generating a term identifier index according to the inverted index. The term identifier index comprises a plurality of sections and each section corresponds to a document. Each section may comprise one or more term identifiers of one or more terms that appear in the document.

21 Claims, 4 Drawing Sheets

(56) References Cited

OTHER PUBLICATIONS

Raymie Stata, et al., "*The Term Vector Database: fast access to indexing terms for Web pages*", Computer Networks 33, Elsevier Science Publishers B.V., pp. 248-255, Jun. 1, 2000.

European Patent Office, Communication, European Search Report Application No. 10153368.5-2201, Ref. P113501EP00/FWW, 6 pages, Jun. 15, 2010.

Brace, Karl S., et al., "Efficient Implementation of a BDD Package", Proceedings of the 27th ACM/IEEE Design Automation Conference, Paper 3.1, © 1990 IEEE, pp. 40-45, Jun. 24, 1990.

Communication from the European Patent Office, European Search Report for European Patent Application No. 08165760.3-1527, 7 pages, Jan. 26, 2009.

European Patent Office Communication, European Search Report and Annex to the European Search Report; Application No. 08165783.5-1527/2045734; Ref. P111732EP00/CLH; 5 pages, Jul. 14, 2009.

Chinese Office Action with English translation; Apllication No. 20100117358.4; pp. 10, Sep. 22, 2011.

Raymie Stata, et al., "*The Term Vector Database: fast access to indexing terms for Web pages*", Computer Networks 33, Elsevier Science Publishers B.V., pp. 247-255, Jun. 1, 2000.

\* cited by examiner

FIG. 1

| | $t_1$ DOG | $t_2$ FOREST | $t_3$ TREE | $t_4$ GRAPHICS | $t_5$ COMPUTER |
|---|---|---|---|---|---|
| | | | | | |
| $t_0$ BINARY | 0.003 | 0.005 | 0.037 | 0.021 | 0.066 |
| $t_1$ DOG | | 0.024 | 0.033 | 0.017 | 0.049 |
| $t_2$ FOREST | | | 0.092 | 0.004 | 0.052 |
| $t_3$ TREE | | | | 0.042 | 0.056 |
| $t_4$ GRAPHICS | | | | | 0.222 |

| TERM IDENTIFIER | DOCUMENT IDENTIFIERS |
|---|---|
| A | 1,3 |
| B | 4 |
| C | 1,3,4,5 |
| D | 2,4,5 |

| ITERATION | | INITIAL | 1 | 2 | 3 | 4 | 5 | 6 | 7 | 8 | 9 | 10 |
|---|---|---|---|---|---|---|---|---|---|---|---|---|
| DATA STRUCTURE | 1 | (1,A) | (3,A) | (3,A) | (3,A) | | | | | | | |
| | 2 | (4,B) | (4,B) | (4,B) | (4,B) | (4,B) | (4,B) | | | | | |
| | 3 | (1,C) | (1,C) | (3,C) | (3,C) | (3,C) | (4,C) | (4,C) | (5,C) | (5,C) | | |
| | 4 | (2,D) | (2,D) | (2,D) | (2,D) | (4,D) | (4,D) | (4,D) | (4,D) | (5,D) | (5,D) | |
| TERM IDENTIFIER INDEX SECTIONS | 1 | | A | AC | AC | AC | AC | AC | AC | AC | AC | AC |
| | 2 | | | | D | D | D | D | D | D | D | D |
| | 3 | | | | | A | AC | AC | AC | AC | AC | AC |
| | 4 | | | | | | | B | BC | BCD | BCD | BCD |
| | 5 | | | | | | | | | | C | CD |

EFFICIENT COMPUTATION OF ONTOLOGY AFFINITY MATRICES

RELATED APPLICATION

This application claims benefit under 35 U.S.C. §119(e) of U.S. Provisional Application Ser. No. 61/152,375, titled "Efficient Computation of Automated Ontology Affinity Matrices," filed Feb. 13, 2009, by Stergios Stergiou et al. This application is incorporated herein by reference.

TECHNICAL FIELD

The present invention relates generally to lexigraphical analysis and, more particularly, to efficient computation of ontology affinity matrices.

BACKGROUND

Data in a document set may hold a large amount of information, yet finding relevant information may be difficult. Keyword searching is the primary technique for finding information. In certain situations, however, keyword searching is not effective in locating information.

DETAILED DESCRIPTION

Overview

In one embodiment, generating an ontology includes accessing an inverted index that comprises inverted index lists for terms of a language. An inverted index list corresponding to a term indicates which documents of a document set include the term. An ontology affinity matrix is created according to the inverted index. The ontology affinity matrix has a plurality of entries that include affinities of term pairs.

In particular embodiments, creating and querying a domain ontology may include the following:

1. Collect Documents in a Domain.

In particular embodiments, a document is a collection of terms. As such, a document may take many forms and can include subsets consisting of other documents. For example, an encyclopedia set, an "A" volume of the encyclopedia set, an article on "Aardvark" in the "A" volume, and a paragraph within the article are all documents as the term is used in this application. A document may comprise readable text, for example, the article on "Aardvark." A document need not comprise text in narrative form, for example, a document may comprise a set of user-entered tags that individually and collectively describe the content of an image. A collection of documents may be referred to as a document set. Thus, an encyclopedia set may be considered a document set and/or a document.

2. Identify the Terms of Interest ("Dictionary Terms") in the Domain.

In particular embodiments, "term" may be interchangeable with "dictionary term." Examples of terms include a word (such as "tree"), a phrase (such as "graph algorithm"), a named entity (such as "New York"), etc. A term (or concept) may have different forms. In certain cases, different words are used for the same concept, for example, "kidney stones" and "kidney calculi" refer to the same concept, "kidney stones." In other cases, a word stem may have many inflected variants, for example, the word stem "tree" has inflected variants "tree" and "trees." In particular embodiments, forms of the same term may be treated as mapped to the same term. In other embodiments, forms of the same term may be treated as separate terms. Any suitable form of a dictionary term may appear in a document, but the particular dictionary term need not appear in any document.

Examples of methods for identifying dictionary terms include using a human-generated dictionary for a specific domain, for example, a medical dictionary. In particular embodiments, a list of dictionary terms may be automatically generated from a set of strings of text in a document set. The strings may be indexed and sorted by frequency, and strings with frequency above a threshold may be selected. Other suitable statistical methods may be used to determine terms.

3. Calculate the Number of Co-Occurrences of Dictionary Terms in a Given Co-Occurrence Context.

Two terms co-occur if they each appear at least once within the same co-occurrence context, such as a document.

4. Create a Directed Weighted Graph that Comprises the Domain Ontology.

The directed weighted graph includes dictionary terms as the nodes and affinities as the weights of the edges. "Directed weighted graph" may be used as the actual representation of the same information that can be represented by any suitable data structure, e.g., a matrix, a Binary Decision Diagram, or a collection of Binary Decision Diagrams.

5. Apply a Procedure to Query the Directed Weighted Graph.

Given one or more dictionary terms as input, the procedure outputs one or more dictionary terms related to the input dictionary terms. For example, the procedure may output a sorted list of one or more terms that have the highest differential directional affinity (described below) towards one or more input terms. In this case, the output includes terms that are more closely related to the input terms, in relation to the domain that the ontology addresses.

Any suitable definitions of affinity may be used. Several examples of affinity types are described below.

Figure 1:
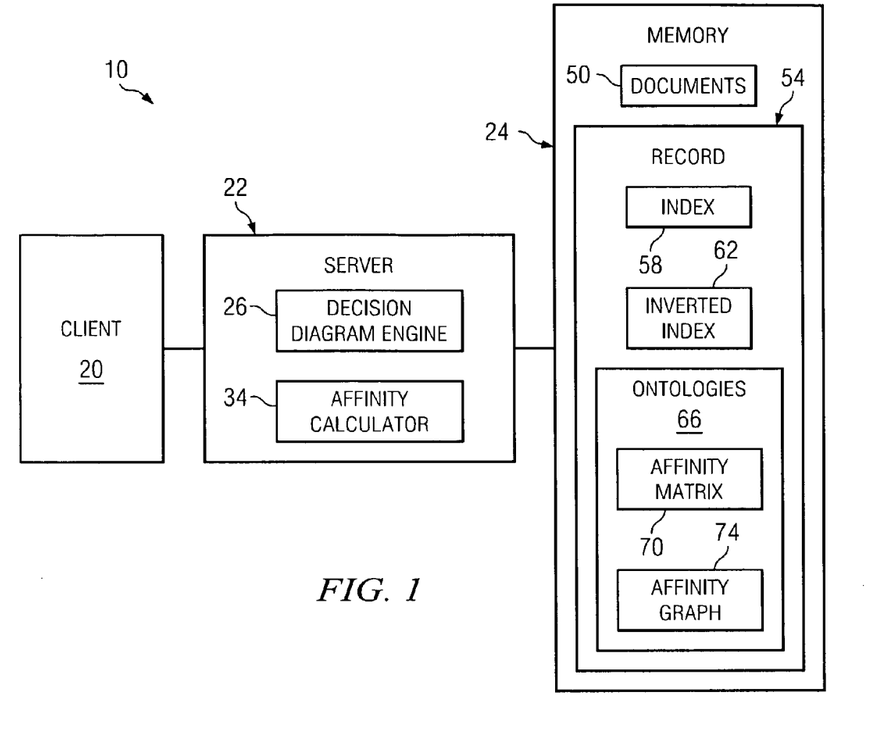
FIG. 1 illustrates an embodiment of a system that generates an ontology of a language from the affinities between the words of the language.

FIG. 1 illustrates an embodiment of a system 10 that generates an ontology of a language from the affinities between the terms of the language. An ontology of a language represents the terms of the language and the relationships among the terms. The affinity between terms describes the relationship between the terms. In an embodiment, system 10 calculates affinities as quantitative values. These values may be used to generate affinity matrices and affinity graphs that serve as the ontology of a language.

In the illustrated embodiment, system 10 includes a client 20, a server 22, and a memory 24. Client 20 allows a user to communicate with server 22 to generate ontologies of a language. Client 20 may send user input to server 22, and may provide (for example, display or print) server output to user.

Server 22 manages applications for generating ontologies of a language. Memory 24 stores data used by server 22.

Memory 24 stores documents 50 and a record 54. A document 50 may refer to a collection of terms and/or images. A term may comprise one or more characters (for example, letters, numbers, spaces, or punctuation) that has one or more particular meanings. Examples of terms include "San Francisco," "plants," "non-stop," and "N9ne." A document with images may be analyzed using tags or other metadata associated with the images.

Examples of a document 50 include one or more words, one or more paragraphs, one or more pages, one or more sections, one or more chapters, one or more traditional documents, one or more books, one or more web pages, correspondence (for example, email and instant messages), and/or other collections of terms. That is, a document can be a word, a paragraph, a section, an image, a page, a traditional document, a chapter, a page section, a book, a webpage, an email, a message, a weblog, etc. A document 50 may be identified by a document identifier. In certain embodiments, multiple documents 50 may belong to a document set. A document set may be associated with a particular subject matter, community, organization, or other entity.

Record 54 describes documents 50. In the embodiment, record 54 includes an index 58, an inverted index 62, and ontologies 66. Index 58 includes index lists, where an index list for a document 50 indicates the terms found in the document 50. Inverted index 62 includes inverted index lists, where an inverted index list for a term indicates the documents 50 that include the word. In one example, list $T_i$ includes document identifiers of documents 50 that include term $t_i$. List $T_i \& T_j$ may include document identifiers of conjunction documents 50 that include both terms $t_i$ and $t_j$. List $T_i + T_j$ may include document identifiers of disjunction documents 50 that include either term $t_i$ or $t_j$. $D(T_i)$ is the number of documents 50 of $T_i$, that is, the number of documents 50 that include term $t_i$.

In an embodiment, a list (such as an index list or an inverted index list) may be stored as a binary decision diagram (BDD). In one example, a binary decision diagram $BDD(T_i)$ for set $T_i$ represents the documents 50 that have term $t_i$.

Server 22 includes decision diagram engine 26. In certain embodiments, decision diagram engine 26 stores lists (such as index lists and/or inverted index lists) as BDDs. In an embodiment, a list may be compressed and then stored as a binary decision diagram (BDD). A list may be compressed in any suitable manner. Decision diagram engine 26 may store an index as a BDD in any suitable manner. In an embodiment, an index list is represented by a Boolean function, and then the Boolean function is represented by a BDD. A list may be represented as a Boolean function in any suitable manner.

Decision diagram engine 26 may represent a Boolean function by a BDD in any suitable manner. Referring back to FIG. 1, decision diagram engine 26 may use any suitable BDD to store a list. Examples of BDDs include reduced ordered BDDs (ROBDDs), partitioned ordered binary decision diagrams (POBDDs), zero-suppressed decision diagrams (ZDDs), nano binary decision diagrams (nanoDDs), zero-suppressed nano binary decision diagrams (nanoZDDs), other suitable binary decision diagrams, and/or a combination of any of the preceding.

In particular embodiments, decision diagram engine 26 compacts a decision diagram and appropriately resizes tables (and allocates more bits per node) for storing the decision diagram as the diagram becomes larger. In particular embodiments, decision diagram engine 26 starts building the decision diagram as a compact decision diagram. Instead of resizing, decision diagram engine 26 directly applies decomposition/composition to graph construction to directly convert a compact decision diagram to an unreduced diagram.

In particular embodiments, a compact decision diagram facilitates communication between parallel platforms. In an example, a first platform operates parallel to a second platform. The first platform may generate a decision diagram, make the decision diagram compact for communication to the second platform, and communicate the compact decision diagram to the second platform. The second platform may reconstruct the decision diagram from the compact decision diagram for processing at the second platform.

Server 22 includes an affinity calculator 34. Affinity calculator 34 calculates any suitable type of affinity for a term $t_i$ or for a term pair comprising a first term $t_i$ and a second term $t_j$. Examples of affinities include a basic, directional, average, differential, and/or other affinity. The affinity calculator 34 may also generate an ontology 66 of a language such as an affinity matrix 70 or an affinity graph 74. An ontology may be generated from any suitable affinity, such as a basic, directional, average, differential, and/or other affinity. Ontologies 66 may be generated from terms selected from a language in any suitable manner. For example, terms from a commonly used portion of the language or terms related to one or more particular subject matter areas may be selected. Affinity matrix calculator 34 may generate an affinity matrix 70 that records affinities between terms.

Figure 2:
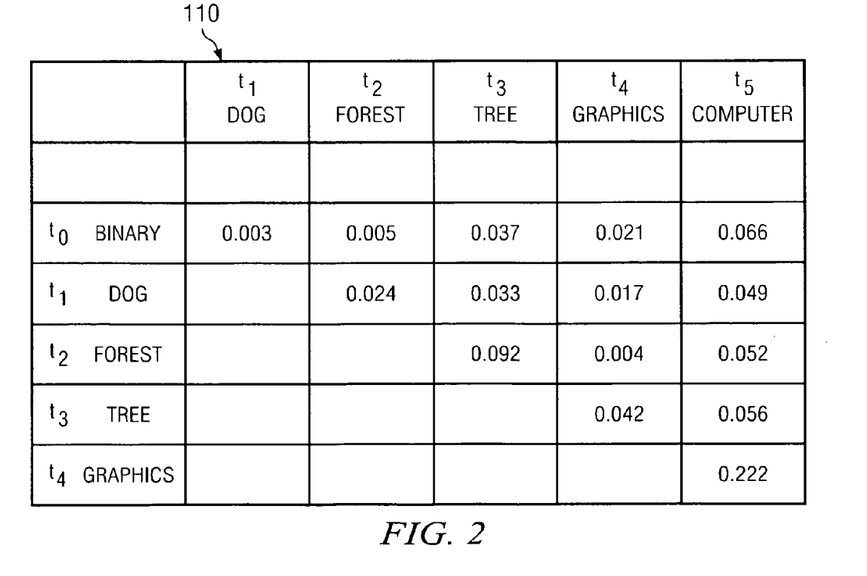
FIG. 2 illustrates an example of an affinity matrix that records basic affinities.

FIG. 2 illustrates an example of an affinity matrix 110 that records basic affinities. A basic affinity may be calculated from the amount (for example, the number) of documents 50 that include terms $t_i$ and/or $t_j$. The conjunction document amount represents the amount of documents 50 that include both term $t_i$ and term $t_j$, and the disjunction document amount represents the amount of documents 50 that include either term $t_i$ or term $t_j$. The basic affinity may be defined as the conjunction document amount divided by the disjunction document amount. In one example, a number of conjunction documents indicates the number of documents comprising term $t_i$ and term $t_j$, and a number of disjunction documents indicates the number of documents comprising either term $t_i$ or term $t_j$. The basic affinity may be given by the number of conjunction documents divided by the number of disjunction documents:

$$\text{Affinity}(t_i, t_j) = D(T_i \& T_j)/D(T_i + T_j)$$

In another embodiment, the basic affinity may be defined as the amount of documents that include both terms $t_i$ and $t_j$ over the maximum of the amount of documents that include $t_i$ or the amount of documents that include $t_j$. For example:

$$\text{Affinity}(t_i, t_j) = D(T_i \& T_j)/\max(D(T_i), D(T_j))$$

In the illustrated example of FIG. 2, affinity matrix 110 records the pairwise basic affinities of terms $t_1, \ldots, t_5$. According to affinity matrix 110, the basic affinity between terms $t_0$ and $t_1$ is 0.003, between terms $t_0$ and $t_2$ is 0.005, and so on.

Figure 3:
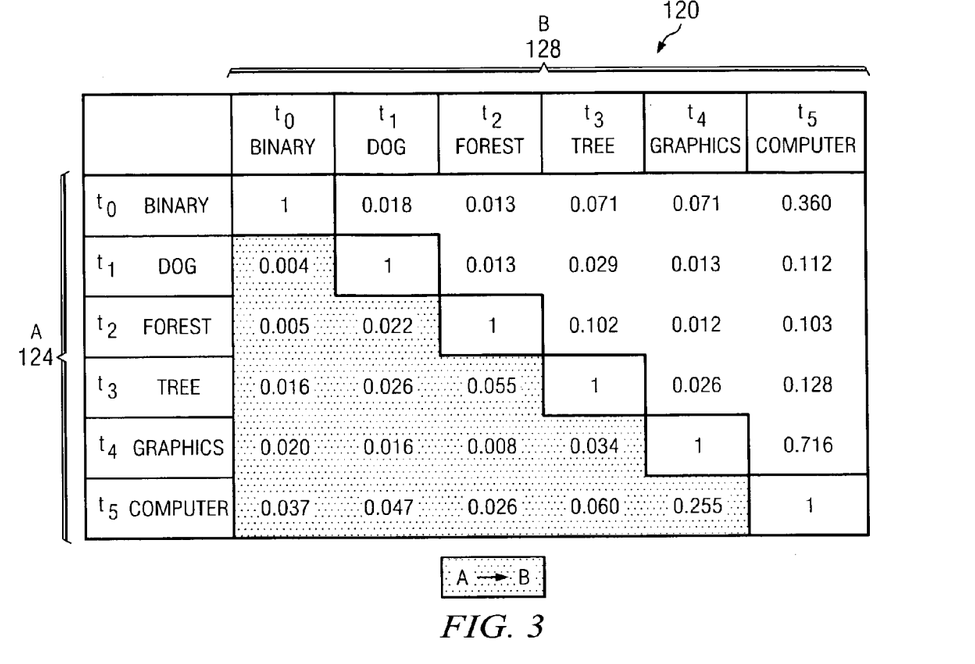
FIG. 3 illustrates an example of an affinity matrix that records directional affinities.

FIG. 3 illustrates an example of an affinity matrix 120 that records the directional affinities for terms $t_0, \ldots, t_5$. The directional affinity DA between terms $t_i$ and $t_j$ may be defined as the conditional probability of observing $t_j$ given that $t_i$ was observed. The directional affinity between terms $t_i$ and $t_j$ may also be called the directional affinity of term pair $t_i$ and $t_j$, or the directional affinity from $t_i$ to $t_j$. A directional affinity may be used to measure the importance of term $t_j$ with respect to term $t_i$. Affinity calculator 34 calculates the directional affinity of term pair $t_i$ and $t_j$ from the amount (for example, the number) of documents 50 that include terms $t_i$ and $t_j$. $D(T_i)$ represents the amount of documents 50 that include term $t_i$. The directional affinity of term pair $t_i$ and $t_j$ may be given by the conjunction document amount $D(T_i \& T_j)$ divided by $D(T_i)$:

$$DAffinity(t_i, t_j) = D(T_i \& T_j)/D(T_i)$$

DAffinity($t_i$, $t_j$) is not equivalent to DAffinity($t_j$, $t_i$) unless $D(T_i) = D(T_j)$. A high directional affinity DAffinity($t_i$, $t_j$) from $t_i$ to $t_j$ indicates a higher probability that a document 50 includes term $t_j$ given that the document 50 includes term $t_i$. In one example, documents [1 2 3 4 5 6] include term $t_i$ and documents [4 2] include term $t_j$. The documents of this example that include term $t_j$ also include term $t_i$, so from the viewpoint of term $t_j$, term $t_i$ is of high importance. Only one-third of the documents that include $t_i$ also include term $t_j$, so from the viewpoint of term $t_i$, term $t_j$ is of relatively lower importance.

In the example of FIG. 3, terms 124 are A terms, and terms 128 are B terms. The rows of matrix 120 record the affinity of a B term given an A term, and the columns of affinity matrix 120 record the affinity of an A term given a B term.

Figure 4:
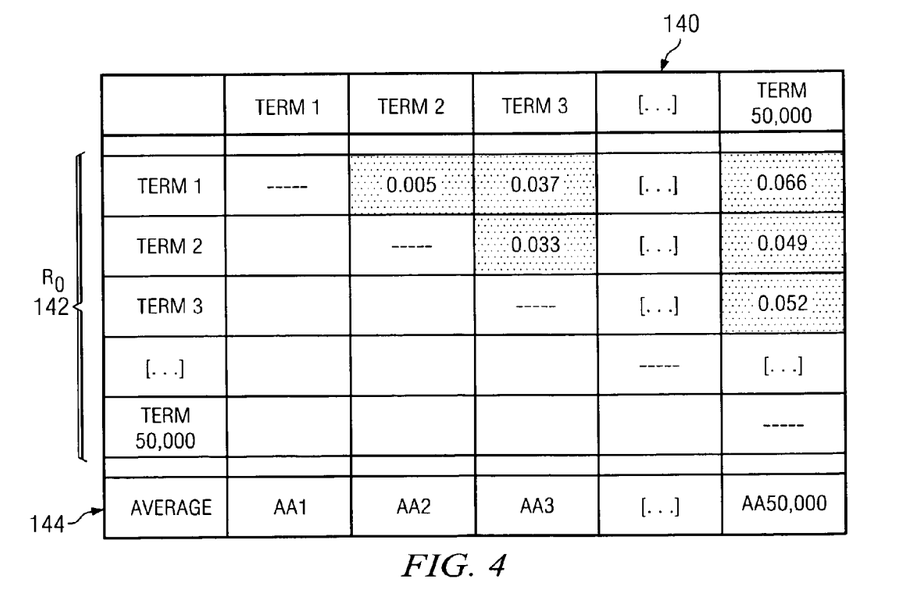
FIG. 4 illustrates an example of an affinity matrix that records average affinities.

FIG. 4 illustrates an example of an affinity matrix 140 that records average affinities. The average affinity of a term $t_i$ may be calculated with respect to the other terms $t_j$. In an embodiment, the average affinity may be the average of the affinities between term $t_i$ and every other term $t_j$. In another embodiment, the average affinity may be determined from the directional affinity from $t_i$ to $t_j$. Thus, the average affinity of term $t_i$ of N terms may be given by:

$$AveAff(t_i) = \frac{1}{N} \sum_{j=1}^{N} DAffinity(t_i, t_j)$$

That is, average affinity may be the average of the directional affinities of a term $t_i$ over the other terms in the co-occurrence contexts. Rows 142 of matrix 140 record basic affinities for term 1 through term 50,000. Row 144 records the average affinities of term 1 through term 50,000. In certain embodiments, an average affinity (or average directional affinity) may be calculated from the directional affinity. In certain embodiments, an average affinity AA vector may be calculated on a specific directional affinity DA array. In certain embodiments, the DA may be stored row-wise, so the calculation may proceed in parallel for the entries in AA. In particular, AA may be generated by summing up the rows of the DA as they are read from the disk and, at the end, normalizing by the number of the dictionary term entries.

The differential affinity or differential directional affinity (DiffDAff) between terms $t_i$ and $t_j$ may be defined as the directional affinity between terms $t_i$ and $t_j$ minus a factor that accounts for the common-ness of the term $t_j$ in the document set. The common-ness of the term $t_j$ in the document set may be a statistical value over the basic affinity or directional affinity values of the term $t_j$ towards the other terms in the document set. In particular embodiment, the common-ness of the term $t_j$ in a document set may be the average affinity (AA) of term $t_j$, which yields the following definition of differential directional affinity:

$$DiffAff(t_i, t_j) = DAffinity(t_i, t_j) - AveAff(t_j)$$

A differential affinity removes the bias caused by the general tendency for term $t_j$ to occur in documents 50. In particular circumstances, a differential affinity may provide a more accurate indication of the probability that a document includes term $t_i$ given that the document includes term $t_j$.

Differential affinities may be used in a variety of applications. In one example, differential affinities among people's names may be used to study social networking. In another example, differential affinities among language elements may be used to study natural language processing. In another example, differential affinities among products may be used to study marketing.

As described above, various types of affinities between terms exist. An example embodiment may create an affinity matrix that records one or more types of affinities between terms. In an embodiment, terms of a language are selected for the ontology. The terms may be selected in any suitable manner. For example, commonly used terms or terms related to a particular subject matter may be selected. Referring again to FIG. 1, affinity calculator 34 accesses record 54 of the selected terms. Affinity calculator 34 may access inverted index 62 to retrieve lists of documents that include the selected terms. The inverted index 62 may be expressed as BDDs or in any other suitable form. Affinity calculator 34 calculates affinities of term pairs of the selected terms and stores them in an ontology affinity matrix. Any suitable affinity may be calculated, for example, a basic, directional, average, differential, and/or other affinity may be calculated. The ontology affinity matrix may be used to represent the ontology of the language.

Affinity calculator 34 may use any suitable technique to search inverted index lists to calculate affinities. In an embodiment, the affinity calculator may use an algorithm that operates on an inverted index obtained from a set of terms (e.g., a dictionary) to calculate a matrix of affinities for the dictionary terms. For relatively large document sets, the execution times for the affinity matrix calculations can be prohibitively long. Some embodiments of the present disclosure may significantly improve execution times when compared with previous approaches.

Figure 5:
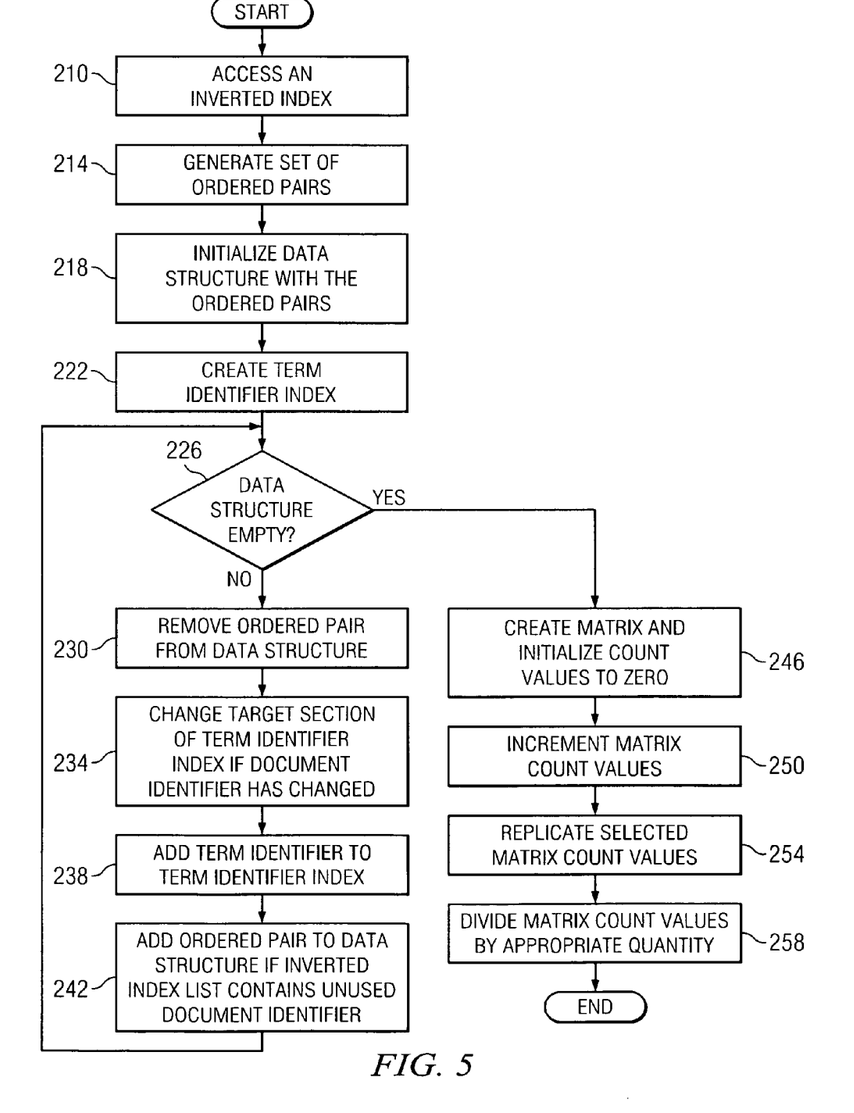
FIG. 5 illustrates an embodiment of a method for generating an ontology of a language that may be performed by the system of FIG. 1.

FIG. 5 illustrates an embodiment of a method for generating an affinity matrix from an inverted index. An embodiment comprises accessing an inverted index, generating a term identifier index according to the inverted index, and generating an ontology affinity matrix.

The method begins at step 210, where an inverted index is accessed. For example, affinity calculator 34 or other element of server 22 may access memory 24 where inverted index 62 is stored. An inverted index indicates where a term can be found within a document set and may comprise a plurality of inverted index lists. Each inverted index list corresponds to a term of a language and includes a term identifier of the term.

A term identifier identifies a term. In general, an identifier can be any suitable representation such as a number, letter, word, symbol, signal, other suitable representation, or combination of the preceding, and may be stored in an electronic medium. As an example, if an inverted index is stored in a matrix with each row comprising an inverted index list, a term identifier of a term could be the number of the row of the matrix that comprises the inverted index list of the corresponding term. In an embodiment, the term identifier may be stored in an electronic medium.

An inverted index list may also include a set of document identifiers. Each document identifier represents a document of a document set in which the term corresponding to the inverted index list appears. For example, if a document set is a book and the pages of the book are the documents, a document identifier may be the number of a page that includes the term of concern.

The document identifiers may be ordered in any suitable manner, and the order may be expressed as an ordered set that goes from a lowest order to a highest order. For example, documents represented by document identifiers 1, 2, 3, and 4 could be ordered: (1, 2, 3, 4), (4, 3, 2, 1), (2, 4, 3, 1), or other suitable order. Similarly, term identifiers may be ordered in any suitable manner. An example of an inverted index is described in more detail with reference to FIG. 6.

Figure 6:
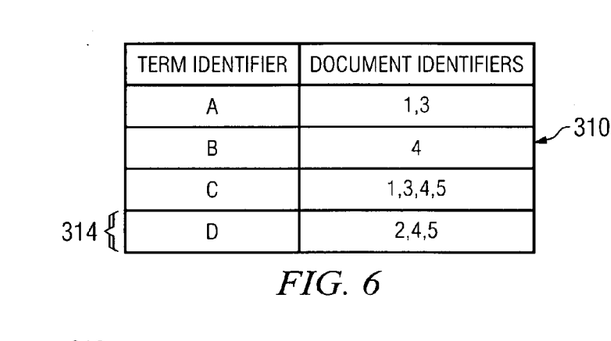
FIG. 6 illustrates an example of an inverted index.

FIG. 6 depicts an exemplary inverted index 310. Inverted index 310 comprises four inverted index lists 314, each corresponding to a term of a language. Each inverted index list includes a term identifier corresponding to the term. For example, the term identifiers a, b, c, and d may respectively correspond to terms apple, boy, cat, and dog. Each inverted index list also includes one or more document identifiers that indicate in which documents the corresponding term appears. For example, one of the inverted index lists includes a term identifier d and document identifiers 2, 4, and 5 of documents in which dog appears.

In an embodiment, a term identifier index may be generated according to an inverted index. A term identifier index is organized in sections, where each section corresponds to a different document of the document set. Each section of a term identifier index may include the term identifiers of the terms that are found in the document corresponding to the section. In an embodiment, a term identifier index may be generated as follows.

Referring again to FIG. 5, steps 214-242 correspond to organizing a plurality of ordered pairs and generating a term identifier index according to the inverted index. These steps are explained with reference to FIG. 7, which depicts the content of an exemplary data structure and an exemplary term identifier index generated from the inverted index 310 of FIG. 6.

At step 214, a set of ordered pairs is generated from the inverted index. An ordered pair comprises a term identifier and a document identifier. In an embodiment, an ordered pair is created from each inverted index list. Each ordered pair may include the term identifier of the inverted index list and the lowest ordered document identifier of the inverted index list.

The ordered pairs may be organized based on the ordering of each ordered pair's document identifier. Ordered pairs having the same document identifier may be further organized based on the ordering of each ordered pair's term identifier. Thus, an ordered pair may be considered the lowest ordered pair of a group of ordered pairs if its document identifier is the lowest ordered document identifier of the group and its term identifier is the lowest ordered term identifier of the ordered pairs of the group having the same document identifier.

For example, an initial set of ordered pairs may be generated from the inverted index of FIG. 6. This initial set includes an ordered pair 318 from each inverted index list. The ordered pairs may be ordered primarily based on document identifiers and secondarily based on term identifiers. For purposes of this example the ordered pairs are represented as: (document identifier, term identifier). The initial ordered pairs include the term identifier and the lowest ordered document identifier of each inverted index list. Thus, the initial set of ordered pairs is (1,A), (4,B), (1,C), and (2,D). This example assumes an ordering scheme in which the order of a document identifier increases as the magnitude of the document identifier increases and the order of a term identifier increases with each successive letter of the standard English alphabet.

Figure 7:
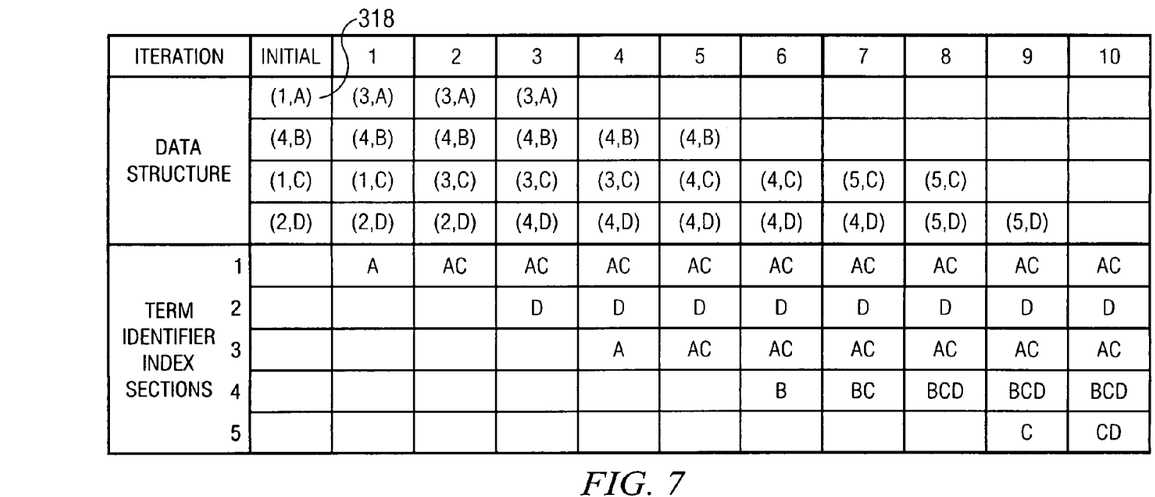
FIG. 7 illustrates an exemplary data structure and term identifier index that may be formed from the inverted index of FIG. 6.

At step 218, a data structure may be created and initialized with a set of ordered pairs created from each inverted index list. The data structure is capable of storing a plurality of ordered pairs. In some embodiments, the data structure is organized to allow fast removal of the lowest ordered pair of the data structure. For example, the data structure may comprise a heap. In an embodiment, the value of each tree node of the heap is lower than or equal to the values of the children nodes of the tree node. Thus, the lowest ordered pair is easily accessible since it may be popped from the top of the heap. In an embodiment, the heap has at most one node for each inverted index list. FIG. 7 shows a data structure comprising the initial set of ordered pairs generated from inverted index 310.

At step 222, a term identifier index is created. The term identifier index may include term identifiers organized in multiple sections corresponding to documents. For example, a section of the term identifier index may include a list of the term identifiers of the terms that appear in the document corresponding to the section. In some embodiments, the list of the term identifiers may be an ordered list. In an embodiment, the term identifier index may comprise a vector. Term identifiers may be added to the term identifier index by removing ordered pairs from the data structure and placing the term identifiers of the removed ordered pairs into target sections of the term identifier index. A target section is a section of the term identifier index into which term identifiers are placed.

At step 226, the data structure is checked to determine whether it includes at least one ordered pair. If it does not, the term identifier index is considered complete and the method moves on to step 246. If the data structure is not empty, the lowest ordered pair is removed from the data structure at step 230. In an embodiment, the lowest ordered pair is "popped" from (i.e., taken from the top of) the data structure.

Referencing FIG. 7, during the first iteration of step 226, the data structure is not empty so the lowest ordered pair (1,A) is removed. In the second iteration, (1,C) is removed. In the third iteration, (2,D) is removed, and so on until the data structure has no ordered pairs.

At step 234, the document identifier of the removed ordered pair is compared with the document identifier of the ordered pair most recently removed from the data structure. If these document identifiers are different, the target section of the term identifier index is changed. For example, the target section may be a first section of the term identifier index where a term identifier of an ordered pair is placed. If the document identifier of a removed ordered pair differs from that of the previous removed ordered pair, the term identifier of the removed ordered pair is placed in a second section. The second section may be distinct from the first section. For example, the first section may comprise a location in a memory and the second section may comprise a non-overlapping location in the memory. Changing the target section may be indicated in any suitable manner. For example, a delimiter may be placed in the term identifier index to mark the end of a section.

Referencing FIG. 7, in the first iteration of step 234, the document identifier of the removed ordered pair (1,A) cannot be checked against the document identifier of a previously removed ordered pair. Accordingly, the target section of the term identifier index remains set to the first section of the term identifier index. In the second iteration, after removal of ordered pair (1,C) from the data structure, the target section remains the same because the document identifier of the previously removed ordered pair was also 1. In the third iteration, after removal of an ordered pair (2,D) with a different document identifier, the target section of the term identifier index is changed to a second section. The iterations continue in a like manner until the last iteration of step 234.

At step 238, the term identifier of the removed ordered pair is placed into the target section of the term identifier index. In an embodiment, the term identifier may be placed in the target section in a manner that preserves ordering within the section. Referencing FIG. 7, in the first iteration of step 238, the term identifier A of the removed pair (1,A) is placed into the first section of the term identifier index. In the second iteration, C is placed in the first section of the term identifier index. In the third iteration, D is placed into the second section of the term identifier index, and so on.

At step 242, the inverted index list of the term identifier most recently placed in the term identifier index is checked to determine whether it has any document identifiers that have not been used in an ordered pair placed in the data structure. If there is at least one unused document identifier within the inverted index list, a next ordered pair is generated comprising the term identifier and the lowest ordered unused document identifier of the inverted index list. This next ordered pair is placed in the data structure. In an embodiment, it is "pushed" onto the data structure. If there are no unused document identifiers in the inverted index list, then no next ordered pair is placed in the data structure.

Referencing FIG. 7, in the first iteration, the inverted index list with the term identifier A is checked to see whether it includes any unused document identifiers. In this case, 1 has been used, but 3 has not. Because 3 is the lowest ordered unused document identifier of this inverted index list, it is included in a new ordered pair along with the term identifier A. The newly generated ordered pair (3,A) is placed in the data structure. In iterations two and three, ordered pairs (3,C) and (4,D) are respectively generated and placed into the data structure. In iteration four, the inverted index list corresponding to term identifier A has no unused document identifiers. Accordingly, no new ordered pair is placed into the data structure during this iteration. The iterations continue in a like manner until the last iteration of step 242.

In an embodiment, the iterations of the above steps may continue until generation of the term identifier index is complete. As shown in FIG. 7, the resulting term identifier index includes A and C in its first section, D in its second section, A and C in its third section, B, C, and D in its fourth section, and C and D in its fifth section.

In an embodiment, if the data structure is empty, the term identifier index may then be used to generate an ontology affinity matrix (AM) at steps 246-258. In an embodiment, each section of the term identifier index could be processed after the section is generated, rather than after all sections are generated. Thus, some or all of steps 246-258 could be performed even though the data structure is not yet empty.

The ontology affinity matrix may comprise a plurality of entries corresponding to an affinity of a term pair (i.e., the affinity between the first term and the second term of the term pair). The entries of the affinity matrix may be represented as AM(i,j), where i is the term identifier of the first term and j is the term identifier of the second term. Each entry of the ontology affinity matrix may comprise a count value that is incremented each time the term pair is found together in a document.

At step 246, a matrix is generated and the count value of each entry is initialized to zero. At step 250, a count value of an entry corresponding to the affinity of a term pair is incremented each time the term pair is found together in a document. In an embodiment, sections of a term identifier index may be accessed in order to determine term identifier pairs (i,j). As described above, the sections of the term identifier index correspond to documents of a document set and the term identifiers within a section of the term identifier index correspond to terms found within the respective document. For each term identifier pair of each section, the count value of AM(i,j) is incremented. The count value may then be used to calculate an affinity between two terms.

In an embodiment, the term identifiers of a section of the term identifier index are organized in order. The lowest ordered term identifier of the section is selected as the first term identifier i. A set of term identifiers that includes the term identifiers of the section that have a higher order than the first term identifier is identified. Each term identifier of this set may be represented as j. The count values of the entries of the matrix that correspond to the affinity between the terms represented by the first term identifier i and each term identifier j of the set are incremented. That is, the count value of AM(i,j) is incremented for each j in the set. Next, the second lowest term identifier of the section is selected as the first term identifier i. A set of term identifiers j that includes all of the term identifiers of the section that have a higher order than the first term identifier is identified. The count values of the entries of the matrix that correspond to the affinity of the first term i and each term identifier j of the set are incremented. This process is repeated until all of the term identifier pairs of the section are processed.

As an example, consider a section of the term identifier index comprising a set of term identifiers comprising numerals 2, 4, 5, and 8. The related term identifier pairs are (2, 4), (2, 5), (2, 8), (4, 5), (4, 8), and (5, 8). Thus, the count values of AM(2,4), AM (2,5), AM (2,8), AM (4,5), AM (4,8), and AM(5,8) are incremented at step 250.

In other embodiments, the term identifier pairs may be identified from the term identifier index in other ways. For example, the process described above could be performed by identifying the highest ordered term identifier of a section and a first set comprising the term identifiers of the section that have a lower order than the highest term identifier, and so on. In other embodiments, the term identifier pairs may be identified by other methods.

In some embodiments, entries of an ontology affinity matrix may correspond to directional affinities of term pairs. As described earlier, the directional affinity is the probability that the second term $t_j$ of the term pair appears in a document of the document set given that the first term $t_i$ of the term pair appears in the document. With a directional affinity, switching the order of the term pair may change the value of the directional affinity. For example, the directional affinity of term pair $(t_i,t_j)$ is not necessarily the same as the directional affinity of term pair $(t_j, t_i)$.

In some embodiments, roughly half of the count values of the matrix may be calculated after each section has been processed. This is because the term identifier pairs are only processed for those pairs where the first term identifier has a lower order than the second term identifier (e.g., i<j). Thus, the count values of AM(i,j) where i>j remain uncalculated after processing the term identifier index.

Accordingly, the ontology affinity matrix may be an upper triangular matrix. Because the count value of an entry corresponds to the number of times the corresponding term pair appears together in a document set, any given count value of AM(i,j) should be equal to the final count value of AM(j,i). Thus, for i<j, the count values of AM(i,j) may be copied into AM(j,i) to obtain count values for the remaining entries of the matrix AM. In an embodiment, the lower-triangular portion of the matrix AM may be obtained from the transpose of the upper triangular matrix.

In some embodiments, a directional affinity matrix is formed by obtaining the count values of an affinity matrix AM and then dividing the count value of each entry AM(i,j) by $D(T_i)$, that is, the number of document identifiers of the inverted index list including the term identifier i. In other words, a count value of an entry of AM corresponding to the affinity between a first term and a second term is divided by the number of documents of a document set in which the first term appears. After performing this operation for each count value, and storing the result in the appropriate entry of AM, the entries of the affinity matrix will each include a directional affinity with the probability that the term corresponding to j will be found in a document of the document set given that the term corresponding to i is found in that document.

In an embodiment, the count value may be overwritten by the directional affinity result. In another embodiment, the directional affinity result may be recorded separately from the count value. The results may be stored in any suitable manner. The ontology affinity matrix may also comprise entries for terms, disjunction document amounts, conjunction document amounts, amounts of documents in lists, etc.

In other embodiments, the count values of the matrix may be divided by different values. For example, a matrix comprising basic affinities may be obtained by dividing the count value of each entry AM(i,j) by $D(T_i+T_j)$, that is, the number of documents that include either term $t_i$ or term $t_j$, or by the larger of $D(T_i)$ and $D(T_j)$, depending on the definition chosen for basic affinity. When a basic affinity matrix BAM is calculated, only half (one triangular area) need be computed since BAM (i,j)=BAM(j,i).

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. A memory may comprise transitory or non-transitory computer-readable media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of affinity calculator 34 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the examples of the matrices without departing from the scope of the invention. A matrix may include more, fewer, or other values. Additionally, the values of the matrix may be arranged in any suitable order.

Modifications, additions, or omissions may be made to the methods disclosed herein without departing from the scope of the invention. The methods may include more, fewer, or other steps. Additionally, steps may be performed in any suitable order.

Certain embodiments of the invention may provide one or more technical advantages. A technical advantage of an embodiment may be that the affinities between terms of a language can be expressed as quantitative values. The affinities may be used to generate a matrix that serves as the ontology of the language. Certain embodiments of the invention may include none, some, or all of the above technical advantages. One or more other technical advantages may be readily apparent to one skilled in the art from the FIGURES, descriptions, and claims included herein.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed:

1. A computer-implemented method comprising:
accessing an inverted index comprising a plurality of inverted index lists in a memory of a computer, each inverted index list corresponding to a term, each inverted index list comprising a term identifier of the term and one or more document identifiers indicating one or more documents of a document set in which the term appears;
using a processor of the computer, generating a plurality of ordered pairs from the inverted index, each ordered pair comprising a term identifier and a document identifier of an inverted index list, the ordered pairs being organized primarily based on the document identifiers of the ordered pairs; and
using the processor of the computer, generating a term identifier index according to the inverted index, the term identifier index comprising a plurality of sections, each section corresponding to a document, each section comprising one or more term identifiers of one or more terms that appear in the document, the generating the term identifier index according to the inverted index comprising organizing the term identifiers of the ordered pairs in the sections of the term identifier index, wherein organizing the term identifiers of the ordered pairs comprises:
removing a selected ordered pair from a data structure;
generating a next ordered pair from the inverted index, the next ordered pair comprising a term identifier equivalent to a term identifier of the selected ordered pair; and
placing the next ordered pair into the data structure.

2. The method of claim 1,
the ordered pairs being organized secondarily based on the term identifiers of the ordered pairs.

3. The method of claim 1, the generating the term identifier index according to the inverted index further comprising:
selecting an ordered pair in order from a data structure; and
placing the term identifier of the selected ordered pair into a section of the term identifier index corresponding to a document to organize the term identifiers of the inverted index according to the documents.

4. The method of claim 1, the generating the term identifier index according to the inverted index further comprising:
determining that a selected ordered pair comprises a document identifier that is not equivalent to a document identifier of a previously selected ordered pair comprising a term identifier placed in a first section; and placing a term identifier of the selected ordered pair in a second section distinct from the first section.

5. The method of claim 1, further comprising:

initializing an ontology affinity matrix comprising a plurality of entries, each entry comprising a count value, each entry corresponding to an affinity of a term pair comprising a first term and a second term; and incrementing the count value of an entry corresponding to the affinity of a selected term pair for each section of the term identifier index that comprises the term identifiers of the selected term pair.

6. The method of claim 1, further comprising:

generating an ontology affinity matrix comprising a plurality of entries, each entry corresponding to an affinity of a term pair comprising a first term and a second term, each entry comprising a count value indicating a number of times the term pair appears together in a document of the document set; and dividing each count value of the ontology affinity matrix by one of a group consisting of a number of documents the first term appears in, a number of documents the second term appears in, and the number of documents the first term appears in plus the number of documents the second term appears in.

7. The method of claim 1, further comprising:

generating an ontology affinity matrix comprising a plurality of entries, each entry corresponding to a directional affinity of a term pair comprising a first term and a second term, the directional affinity comprising the probability that the second term appears in a document of the document set given that the first term appears in the document.

8. An apparatus comprising:

a memory operable to:

store an inverted index comprising a plurality of inverted index lists, each inverted index list corresponding to a term, each inverted index list comprising a term identifier of the term and one or more document identifiers indicating one or more documents of a document set in which the term appears; and a processor operable to execute logic to:

generating a plurality of ordered pairs from the inverted index, each ordered pair comprising a term identifier and a document identifier of an inverted index list, the ordered pairs being organized primarily based on the document identifiers of the ordered pairs; and generate a term identifier index according to the inverted index, the term identifier index comprising a plurality of sections, each section corresponding to a document, each section comprising one or more term identifiers of one or more terms that appear in the document, the generating the term identifier index according to the inverted index comprising organizing the term identifiers of the ordered pairs in the sections of the term identifier index, wherein organizing the term identifiers of the ordered pairs comprises:

removing a selected ordered pair from a data structure;

generating a next ordered pair from the inverted index, the next ordered pair comprising a term identifier equivalent to a term identifier of the selected ordered pair; and placing the next ordered pair into the data structure.

9. The apparatus of claim 8, the ordered pairs being organized secondarily based on the term identifiers of the ordered pairs.

10. The apparatus of claim 8, the generating the term identifier index according to the inverted index further comprising:

selecting an ordered pair in order from a data structure; and placing the term identifier of the selected ordered pair into a section of the term identifier index corresponding to a document to organize the term identifiers of the inverted index according to the documents.

11. The apparatus of claim 8, the generating the term identifier index according to the inverted index further comprising:

determining that a selected ordered pair comprises a document identifier that is not equivalent to a document identifier of a previously selected ordered pair comprising a term identifier placed in a first section; and placing a term identifier of the selected ordered pair in a second section distinct from the first section.

12. The apparatus of claim 8, the processor further operable to:

initialize an ontology affinity matrix comprising a plurality of entries, each entry comprising a count value, each entry corresponding to an affinity of a term pair comprising a first term and a second term; and increment the count value of an entry corresponding to the affinity of a selected term pair for each section of the term identifier index that comprises the term identifiers of the selected term pair.

13. The apparatus of claim 8, the processor further operable to:

generate an ontology affinity matrix comprising a plurality of entries, each entry corresponding to an affinity of a term pair comprising a first term and a second term, each entry comprising a count value indicating a number of times the term pair appears together in a document of the document set; and divide each count value of the ontology affinity matrix by one of a group consisting of a number of documents the first term appears in, a number of documents the second term appears in, and the number of documents the first term appears in plus the number of documents the second term appears in.

14. The apparatus of claim 8, the processor further operable to:

generate an ontology affinity matrix comprising a plurality of entries, each entry corresponding to a directional affinity of a term pair comprising a first term and a second term, the directional affinity comprising the probability that the second term appears in a document of the document set given that the first term appears in the document.

15. A non-transitory, tangible computer-readable medium having computer-executable code, when executed by a computer operable to:

access an inverted index comprising a plurality of inverted index lists, each inverted index list corresponding to a term, each inverted index list comprising a term identifier of the term and one or more document identifiers indicating one or more documents of a document set in which the term appears;

generating a plurality of ordered pairs from the inverted index, each ordered pair comprising a term identifier and a document identifier of an inverted index list, the ordered pairs being organized primarily based on the document identifiers of the ordered pairs; and generate a term identifier index according to the inverted index, the term identifier index comprising a plurality of sections, each section corresponding to a document, each section comprising one or more term identifiers of one or more terms that appear in the document, the generating the term identifier index according to the inverted index comprising organizing the term identifiers of the ordered pairs in the sections of the term identifier index, wherein organizing the term identifiers of the ordered pairs comprises:

removing a selected ordered pair from a data structure;

generating a next ordered pair from the inverted index, the next ordered pair comprising a term identifier equivalent to a term identifier of the selected ordered pair; and placing the next ordered pair into the data structure.

16. The medium of claim 15, the ordered pairs being organized secondarily based on the term identifiers of the ordered pairs.

17. The medium of claim 15, the generating the term identifier index according to the inverted index further comprising:

selecting an ordered pair in order from a data structure; and placing the term identifier of the selected ordered pair into a section of the term identifier index corresponding to a document to organize the term identifiers of the inverted index according to the documents.

18. The medium of claim 15, the generating the term identifier index according to the inverted index further comprising:

determining that a selected ordered pair comprises a document identifier that is not equivalent to a document identifier of a previously selected ordered pair comprising a term identifier placed in a first section; and placing a term identifier of the selected ordered pair in a second section distinct from the first section.

19. The medium of claim 15, further operable to:

initialize an ontology affinity matrix comprising a plurality of entries, each entry comprising a count value, each entry corresponding to an affinity of a term pair comprising a first term and a second term; and increment the count value of an entry corresponding to the affinity of a selected term pair for each section of the term identifier index that comprises the term identifiers of the selected term pair.

20. The medium of claim 15, further operable to:

generate an ontology affinity matrix comprising a plurality of entries, each entry corresponding to an affinity of a term pair comprising a first term and a second term, each entry comprising a count value indicating a number of times the term pair appears together in a document of the document set; and divide each count value of the ontology affinity matrix by one of a group consisting of a number of documents the first term appears in, a number of documents the second term appears in, and the number of documents the first term appears in plus the number of documents the second term appears in.

21. The medium of claim 15, further operable to:

generate an ontology affinity matrix comprising a plurality of entries, each entry corresponding to a directional affinity of a term pair comprising a first term and a second term, the directional affinity comprising the probability that the second term appears in a document of the document set given that the first term appears in the document.

\* \* \* \* \*